Figure 8:
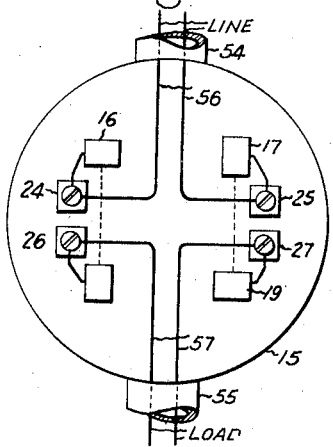

Jan. 11, 1938.                H. A. BAKKE                2,105,396
                        ELECTRIC METER MOUNTING
                         Filed May 9, 1935          2 Sheets-Sheet 1
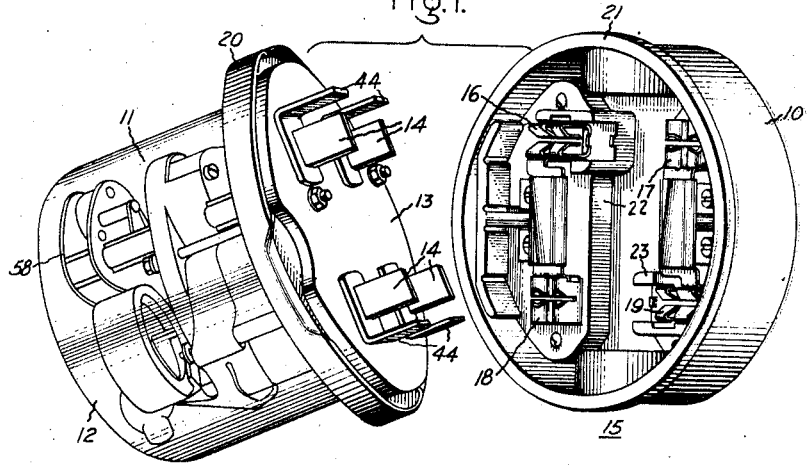
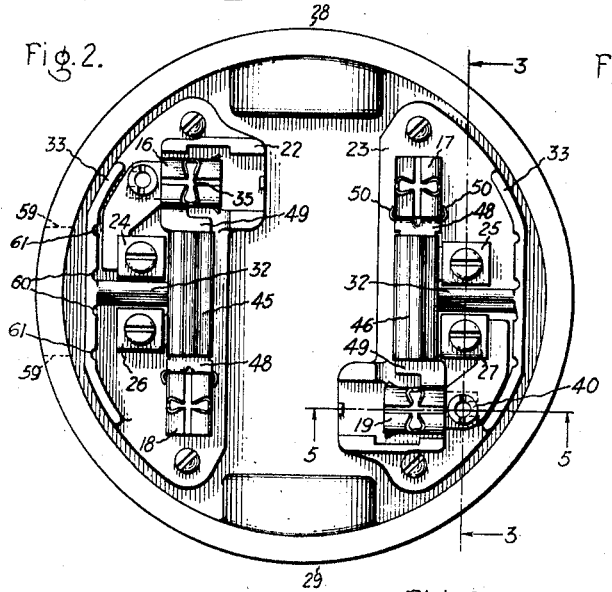
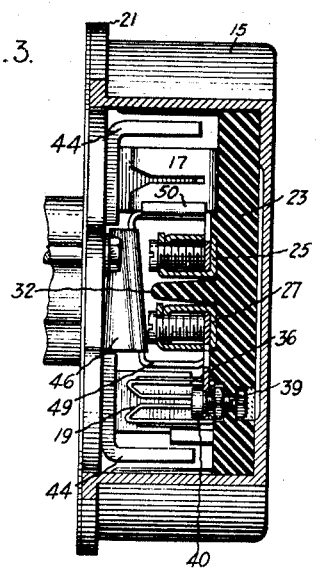
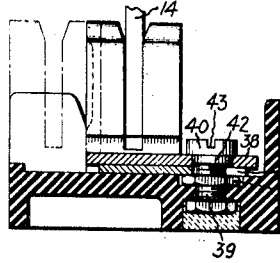
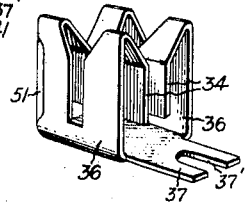
Inventor:
Hans A. Bakke,
by Harry E. Dunham
His Attorney Jan. 11, 1938.  H. A. BAKKE  2,105,396
ELECTRIC METER MOUNTING
Filed May 9, 1935  2 Sheets-Sheet 2

Inventor:
Hans A. Bakke,
by Harry E. Dunham
His Attorney

Patented Jan. 11, 1938

2,105,396

UNITED STATES PATENT OFFICE 2,105,396

ELECTRIC METER MOUNTING

Hans A. Bakke, Swampscott, Mass., assignor to General Electric Company, a corporation of New York Application May 9, 1935, Serial No. 20,592

15 Claims. (Cl. 247—2)

My invention relates to electrical instruments and mountings for such devices. It concerns particularly mounting arrangements for detachable integrating meters.

It is an object of my invention to provide a compact, serviceable mounting arrangement for universal detachable meters adapted to widely varying conditions of operation and installation.

Another object of my invention is to provide an easily detachable electrical device which is automatically connected into an electrical circuit when it is mounted in place and which automatically short-circuits the connecting contacts when the device is removed in order to maintain the continuity of the electrical circuits.

It is another object to provide such a device with a disconnect feature to permit causing the electrical circuit to remain open when the device is mounted in place.

Still another object of my invention is to provide a mounting socket for a detachable electrical device, particularly one having four connection clips in which the electrical device will be receivable in the same position although the mounting socket may have been rotated into different angular positions.

Other and further objects and advantages will become apparent as the description proceeds.

In accordance with my invention in its preferred form as applied specifically to universal detachable integrating meters, I provide any desired type of integrating meter mounted on a base plate with contact prongs extending through the base plate and a socket or receptacle for receiving such a meter with split terminal clips for receiving the contact prongs. The terminal clips are slotted both lengthwise and crosswise and both the contact prongs and the terminal clips are placed at the corners of a square to permit inserting the meter into the socket in any one of four different relative angular positions. The socket is provided with a pair of oppositely located threaded conduit-receiving openings so that the same sockets may be employed in installations where the conduits are run vertically as where they are run horizontally without changing the normal position of the integrating meter.

Short-circuiting jumpers are provided between the terminal clips in the meter-receiving socket, which connect corresponding contact clips to maintain continuity of service when the meter is removed but are depressed out of engagement when the meter is inserted in the socket to permit the electrical circuits to be completed through the meter windings. One or more of the terminal clips are slidably mounted so that they may be moved away from the position which will be occupied by the contact prong of the meter when mounted in order to leave the meter disconnected from the circuit even when it is mounted in position.

Figure 9:
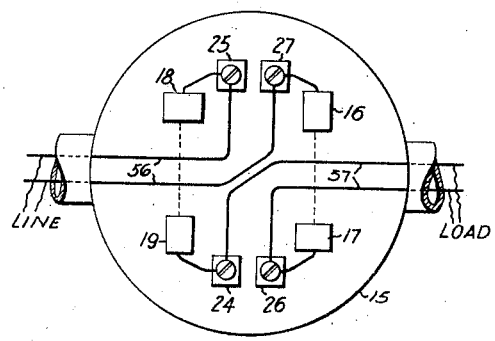
Figure 10:
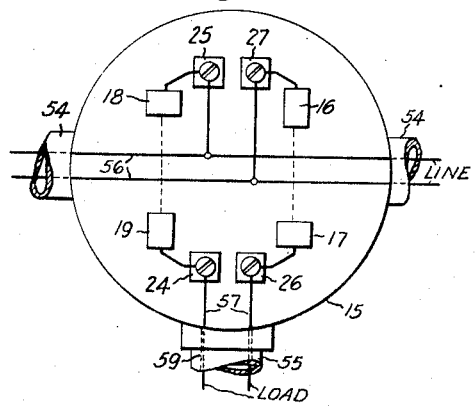
Figure 11:
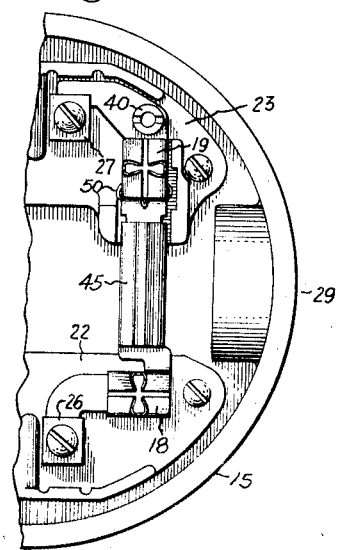
Figure 12:
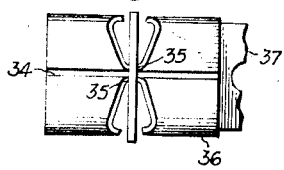
Figure 13:
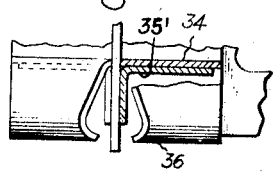

The features of my invention which are believed to be novel and patentable will be pointed out in the claims appended hereto. A more complete understanding of my invention may be obtained from the following description taken in connection with the accompanying drawings in which Fig. 1 is a view in perspective of a detachable meter mechanism and a mounting socket adapted to receive the meter mechanism; Fig. 2 is a plan view of the socket; Fig. 3 is a vertical section cut by the plane 3—3 shown in Fig. 2; Fig. 4 is a detailed view illustrating the manner in which the circuit-maintaining jumpers make contact; Fig. 5 is a detailed view of the slidable terminal clip showing the cross section cut by the plane 5—5 of Fig. 2 and illustrating the manner in which the clip serves as a circuit disconnector; Fig. 6 is a view of the section cut by the plane 6—6 through the circuit-maintaining jumper partially illustrated in Fig. 4; Fig. 7 is a perspective view of one of the slidable contact terminal clips illustrated in Figs. 2 and 5; Figs. 8, 9, and 10 are schematic diagrams illustrating the manner of using the meter receiving socket with conduit running in various directions; Fig. 11 is a fragmentary plan view of the socket showing the manner of inserting the circuit-maintaining jumper when the socket is arranged for horizontally-running conduit; Fig. 12 is a plan view of a terminal clip; and Fig. 13 is a fragmentary view of a modified terminal clip.

Referring now more in detail to the drawings in which like parts are designated by like reference characters throughout, I have illustrated the manner of carrying out my invention in detachable watt-hour meters but it will be understood that my invention is not limited thereto but is applicable to detachable electrical devices of any kind. In Fig. 1 is shown a watt-hour meter mechanism 11 of any suitable type, preferably enclosed in a protecting cup-shaped glass case 12 and mounted upon a base plate 13 serving both as a closure for the glass case 12 and as a mounting for the meter mechanism and its contact terminals. The contact terminals of the meter mechanism take the form of flat contact prongs 14 projecting through the base plate 13.

There is provided also a receptacle or socket 15 for receiving the meter mechanism 11 and comprising a shallow cup-shaped base 10 having mounted therein split terminal clips 16, 17, 18, and 19 adapted to cooperate with the terminal prongs 14. In order to provide a weatherproof closure protecting the terminals, in order to permit mounting the meter mechanism more securely upon the socket 15, and in order to permit locking or sealing these members together, the meter unit 11 may be provided with a cover rim 20 and the meter-receiving socket 15 may be provided with a flange 21 cooperating with the cover rim 20. It will be understood that a suitable clamping rim and sealing arrangement, such as that shown at 12 in Fig. 1 of United States Patent No. 1,969,499 to Bradshaw et al, for example, may be employed for securing the rim 20 upon the flange 21 and for locking the meter unit 11 and the terminal chamber formed by the socket 15.

Insulating blocks 22 and 23 are secured to the bottom wall of the socket 15 for supporting and insulating the terminal clips 16, 17, 18, and 19. Screw terminals 24, 25, 26, and 27 are also mounted upon the insulating blocks 22 and 23 to permit connecting the terminal clips 16, 17, 18, and 19 to the line conductors of an electrical circuit in which the electrical meter is to be connected. The socket 15 is provided with oppositely placed openings 28 and 29 to permit the entry of line conductors for connection to the terminals 24, 25, 26, and 27. Preferably, the walls of the socket 15 are reenforced by inwardly extending nipples at the openings 28 and 29 and these are threaded to receive conduit of the type usually employed for enclosing electrical conductors. The insulating blocks 22 and 23 may be formed with upwardly extending baffles 32 between line terminals 24 and 26 and between line terminals 25 and 27 in order to guard more effectively against short-circuits between conductors connected to these terminals. The insulating blocks 22 and 23 may also be provided with upwardly extending shields 33 to guard against grounding electrical conductors against the side walls of the socket 15.

Each of the terminal clips 16, 17, 18, and 19 consists of parallel strip portions 34 (Figs. 7 and 12) between which a longitudinal slot is formed, cooperating with prongs 14 of the meter mechanism 11. The inner surfaces of the longitudinal slot provided between these strip portions 34 obviously serve as contact surfaces to form electrical contact with the outer surfaces of the prongs 14. The terminal clips 16, 17, 18, and 19 may be formed in any suitable manner to provide such a horizontal slot. However, for the sake of obtaining resiliency in the engagement between the slot and the contact prongs and for the sake of convenience and economy in manufacture, the terminal clips may conveniently be formed from a single strip of conducting metal with the ends doubled back and the center bent up in the form of a U in the manner shown in Fig. 7 to provide the strip portions 34 forming the longitudinal slot. The resultant shape may be described as a reentrant U with the originally central portions 36 of the strip forming the arms of the main U and the portions 34 forming the reentrant ends.

The terminal clips 16 to 19 are also slotted crosswise to form contact edges 35 adapted to make electrical contact with the prongs 14 when the latter are inserted crosswise into the cross slots formed between the contact edges 35 in the terminal clips 16 to 19. The terminal clips may be made to receive the prongs 14 resiliently also when inserted crosswise into the cross slots by making the cross slots wider in the strip portions 36 than in the strip portions 34, as illustrated in Fig. 12, so that the contact with the prongs 14 takes place primarily at the edges 35 at the centers of the split terminal clips.

If additional contact is considered essential when the prongs 14 are inserted crosswise, the cross slots may be of the same width in both portions 34 and 36 of the terminal clips. Still greater contact area for the crosswise positions of the contact prongs 14, without sacrificing resiliency of engagement, may be obtained by fastening angle strips 35' to the strip portions 34 in any suitable manner as by soldering or welding; or, if desired, the terminal clips may be formed from strips with transversely extending portions at the ends, which may be doubled back upon the portions 34 to form the angle portions 35'.

Preferably, the contact clips 16, 17, 18, and 19 are so mounted that the adjacent terminal clips have their contact surfaces perpendicular but the diagonally opposite clips have their contact surfaces parallel. In this manner, a fixed distance between the terminal clips at adjacent corners of a square can more readily be obtained and slight discrepancies in the spacing of the terminal clips or of the prongs 14 will be allowed for by the lateral yielding of the terminal clip receiving the contact prong in its longitudinal slot. A similar result might also be accomplished if the contact prongs 14 were arranged with adjacent prongs in perpendicular planes. Cross slots in the clips 16—19 would not then be required. However, the prongs 14 are shown parallel since this is the arrangement which has been adopted as standard for detachable meters of the socket type by various meter manufacturers.

One or more of the terminal clips are provided with tongues 37 having slots 37' in order to permit the terminal clip to be slidably mounted and to serve as a disconnect contact. This feature, shown as applied to terminal clips 16 and 19, is illustrated more in detail in Fig. 5 from which it will be seen that a relatively stiff metallic strip 38 is provided which lies over the tongue 37 of the terminal clip. In order to clamp the strip 38 tightly against the tongue 37 of the terminal clip, a bolt 39 is provided having a nut 40 cooperating therewith. When the nut 40 is loosened, the terminal clip may be slid to the right (viewing Fig. 5) in order to be in the proper position to receive the prong 14 or may be slid to the left away from the position which the prong 14 would occupy when the meter mechanism is mounted upon the socket 15 in order to prevent completing an electrical circuit through the meter winding.

Preferably a nut 41 is provided for holding the bolt 39 permanently in place in the insulating block 23. The nut 40 may be of a special construction, having a portion 42 of reduced diameter fitting an opening in the clamping strip 38, and having slots 43 to permit operation by means of a screw driver. If this construction is employed, the bolt 39 is preferably made too short to extend into the slotted portion of the nut 40 and an ordinary screw driver instead of a special wrench may be employed for manipulating the nut 40 and the sliding contact clip. Since screw drivers with insulated handles are readily available, the slidable terminal clips may be loosened and moved to one position or another without endangering the operator or subjecting him to the possibility of electric shock.

Guide fingers 44, preferably of insulating material, may be provided on the base plate 13 for the purpose of guiding the contact prongs 14 into the slots in the terminal clips 16 to 19 when the meter mechanism 11 is mounted in place on the socket 15.

In order to avoid leaving the electrical circuit open when the meter mechanism 11 is removed, circuit-closing jumpers 45 and 46 may be provided. Each of these jumpers consists of a strip of conducting spring material, such as hard copper or brass, with a straight center portion 47 and bent ends 48 and 49. One bent end 48 is provided with curved flanges or fingers 50 adapted to grip one of the terminal clips to permit the jumper 45 to be supported at one end by the terminal clip. The construction is such that the circuit-closing jumpers 45 and 46 may readily be removed from their supporting terminal clips merely by pulling them away from the flat bottom wall of the socket 15. In order that the jumpers 45 and 46 may be supported more securely by the terminal clips, the latter are preferably bent outward at the edges intended to support the jumpers in the manner shown in Figs. 4 and 7 to form lips 51.

In the arrangement shown in Fig. 2, the jumpers 45 and 46 are arranged vertically, one being supported by the terminal clip 17 and extending downwardly, and the other being supported by the terminal clip 18 and extending upwardly. In each of the jumpers 45 and 46, the bent end 49 preferably makes an angle of slightly more than ninety degrees with the straight portion 47 and the end 48 is bent at such an angle to the straight portion 47 that the resilience of the jumper 45 or 46 normally tends to cause the end 49 to spring away from the bottom of the socket 15 in such a manner that it comes in contact with one of the outer surfaces of the strip portion 36 of the co-operating terminal clip. The arrangement is such that, when the straight portion 47 of the jumper 45 or 46 is pressed downward toward the bottom of the socket 15, the projected length of the jumper shortens and causes the bent end 49 to move away from the strip portion 46 of the terminal clip, as shown in Fig. 3, so as to break the circuit between the terminal clips. Preferably, the straight portion 47 of the jumper 45 or 46 carries a bent insulating strip or sheath 52 having a rib portion 53 of such height that, when the meter mechanism 11 is mounted in place, the base plate 13 abuts the ribs 53, depresses the jumpers 45 and 46 to open the short circuits between the terminal clips, and permits the current to flow through the windings of the meter mechanism 11. The height of the rib 53 may be tapered to cause the top edge of the rib to lie substantially along the base plate 13 when the meter mechanism 11 and its receptacle 15 are connected and the jumpers 45 and 46 are depressed.

Figs. 1, 2, 3, and 8 illustrate the position of the socket 15 for receiving conduit running in a vertical direction. In the schematic diagram, Fig. 8, the conduit 54 carrying the line conductors and the conduit 55 carrying the load conductors are shown entering the socket 15 from above and below, respectively. The same socket 15 may be employed for connection to conduit running in a horizontal direction, as shown in Fig. 9, without removing or rearranging any of the terminals 16 to 19 or 24 to 27. In this case, the line conductors 56 are connected to the terminals 25 and 27 instead of to the terminals 24 and 25, and the load conductors 57 are connected to the terminals 24 and 26 instead of to the terminals 26 and 27 when the socket 15 is installed in the location where the meter is to be mounted. No changes in any of the parts of the socket need be made, however, so that only one type of socket need be stocked by central station companies for installation with either vertical or horizonal conduit.

Owing to the equidistant spacing of the prongs 14 and the terminal clips 16 to 19 and owing to the fact that the terminal clips are provided with both longitudinal and cross slots, the meter mechanism 11 is mounted in its normal position with the dial 58 upwards regardless of whether the socket 15 is installed in the position shown in Fig. 8 or at ninety degrees thereto in the position shown in Fig. 9. If it is desired to mount the meter mechanism in place for the purpose of locking the sealing the meter and the terminal connections to prevent unauthorized tampering therewith or unauthorized connection to the power circuits, this may be done even when it is desired to disconnect the service. If the meter mechanism 11 is to be mounted with the electric service disconnected, the terminal clip 16 is first slid to the right and the terminal clip 19 is slid to the left (with respect to Fig. 2 or 8) by loosening the nuts 40. This can be done whether the socket 15 is installed in the manner shown in Fig. 8 or in the manner shown in Fig. 9.

If the installation of Fig. 8 is to be provided with circuit-closing jumpers, the jumpers 45 and 46 are slipped on to the terminal clips 17 and 18 in the manner already described and the use of the jumpers interferes in no way with the disconnecting feature obtained by sliding the clips 16 and 19 horizontally.

If the circuit-maintaining feature is to be provided in the installation of Fig. 9, the jumpers 45 and 46 are slipped over the terminal clips 16 and 19 as illustrated in Fig. 11 instead of over the clips 17 and 18 and, of course, in this case, it is necessary to leave the terminal clips 16 and 19 fastened in the circuit-connecting position as long as the jumpers 45 are in use. If it is desired to disconnect the service, however, the jumpers 45 and 46 are merely slipped off and the clips 16 and 19 are then slid to the disconnecting position.

The meter-receiving socket shown in Figs. 1 to 3 may also be used in case the T or X arrangement of conduit is desired. For example, in Fig. 10 is shown the T connection with the horizontal conduit 54 carrying line conductors which run through the socket 15 and a vertical conduit 55 carrying load conductors connected to terminals 24 and 26. The electrical arrangement is the same as that shown in Fig. 9. However, to accommodate the vertical 55, it is necessary to drill an opening 59, represented by dotted lines in Fig. 2, through the side wall of the socket 15 and, in this case, the portions of the insulating shield 33 between the grooves 60 and between the grooves 61 are broken away to permit conductors 57 to be brought to the terminals 24 and 26.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A detachable electrical instrument comprising in combination, an instrument mechanism mounted on a base plate with four flat contact prongs mounted thereon at the four corners of a square and extending through said base plate, and a receptacle for said instrument mechanism, said receptacle comprising in combination, a base, four cross-slotted split terminal clips mounted thereon at the four corners of a square, each clip having parallel contact surfaces between which a longitudinal slot is formed, each clip having its contact surfaces perpendicular to those of the clips on adjacent corners of the square but parallel to those of the clip on the diagonally opposite corner of the square, each clip having a cross-slot forming cooperating contact edges and being in line with the longitudinal slot in one of the adjacent clips, one of the clips being mounted to be slidable from the position normally occupied by the corresponding contact prong when the instrument mechanism and the receptacle are united, and a circuit-closing jumper, attached at one end to one of the terminal clips, having a free end extending towards one of the adjacent terminal clips and resiliently engaging it when said instrument mechanism is separated from its receptacle, but being depressed by the base plate of said instrument mechanism to disengage the terminal clip when the instrument mechanism and its receptacle are united.

2. A detachable electrical instrument comprising in combination, an instrument mechanism having a set of four terminal contacts and a receptacle for receiving said instrument mechanism comprising in combination, a base, and a set of four terminal contacts mounted thereon at the four corners of a square to cooperate with said first mentioned set of contacts, one set of contacts comprising flat prongs and the other set comprising cross-slotted split terminal clips, each clip having parallel contact surfaces between which a longitudinal slot is formed and having a cross slot forming cooperating contact edges, each slot in each clip being in line with and parallel with one of the slots of the clip on the adjacent corner of the square.

3. A detachable electrical instrument comprising in combination, an instrument mechanism having a set of four terminal contacts thereon and a receptacle for receiving said instrument mechanism comprising in combination, a base, and a set of four terminal contacts mounted thereon at the four corners of a square to cooperate with said first mentioned set of contacts, one set of contacts comprising flat contact prongs and the other set comprising split terminal clips, each clip having parallel contact surfaces between which a longitudinal slot is formed, each clip having its contact surfaces perpendicular to those of the clip on the adjacent corners of the square but parallel to those of the clip on the diagonally opposite corner of the square.

4. A detachable electrical instrument comprising in combination, an instrument mechanism having a set of terminal contacts, a receptacle for said instrument mechanism comprising in combination, a base, and a set of terminal contacts mounted thereon and adapted to cooperate with the contacts on said instrument mechanism, one set of contacts comprising contact prongs and the other set comprising terminal clips, one of the contacts of one of said sets being mounted to be slidable from the position which is normally occupied by the corresponding contact of the other set when said instrument mechanism and its receptacle are united.

5. A detachable electrical instrument comprising in combination, an instrument mechanism having a set of terminal contacts and a receptacle for receiving said instrument mechanism comprising in combination, a base, a set of terminal contacts mounted thereon to cooperate with the contacts of said instrument mechanism, and a circuit-closing jumper attached at one end to one of the terminal contacts of said receptacle, having a free end extending towards one of the other terminal contacts of said receptacle and resiliently engaging it when said instrument mechanism and its receptacle are separated, but being adapted to be depressed by said instrument mechanism to disengage the terminal contact when the instrument mechanism and its receptacle are united.

6. A receptacle for a detachable electrical device with two pairs of terminals comprising in combination, a base, four cross-slotted split terminal clips mounted thereon at the four corners of a square, each clip having parallel contact surfaces between which a longitudinal slot is formed, each clip having its contact surfaces perpendicular to those of the clips on adjacent corners of the square but parallel to those of the clip on the diagonally opposite corner of the square, each clip having a cross-slot forming cooperating contact edges and being in line with the longitudinal slot in one of the adjacent clips, one of the clips being slidably mounted, and a circuit-closing jumper attached at one end to one of the terminal clips, having a free end extending towards one of the adjacent terminal clips, and resiliently engaging it, but being yieldable to disengage the terminal clip.

7. A receptacle for a detachable electrical device with two pairs of terminals comprising in combination, a base, and four cross-slotted split terminal clips mounted thereon at the four corners of a square, each clip having parallel contact surfaces between which a longitudinal slot is formed, each clip having its contact surfaces perpendicular to those of the clips on the adjacent corners of the square but parallel to those of the clip on the diagonally opposite corner of the square, each clip having a cross slot forming cooperating contact edges and being in line with the longitudinal slot in one of the adjacent clips.

8. A receptacle for a detachable electrical device comprising in combination, a base, a plurality of cross-slotted split terminal clips mounted thereon, each clip having parallel contact surfaces between which a longitudinal slot is formed, each clip having a cross-slot forming cooperating contact edges and being in line with the longitudinal slot in one of the adjacent clips.

9. A receptacle for a detachable electrical device with two pairs of terminals comprising in combination, a base, and four split terminal clips mounted thereon at the four corners of a square, each clip having parallel contact surfaces between which a longitudinal slot is formed, each clip having its contact surfaces perpendicular to those of the clips on the adjacent corners of the square but parallel to those of the clip on the diagonally opposite corner of the square.

10. A receptacle for a detachable electrical device adapted to be sealed thereto comprising in combination, a base and a plurality of terminal clips mounted thereon, one of said clips being slidably mounted.

11. A receptacle for a detachable electrical device comprising in combination, a base, a plurality of terminal clips mounted thereon, and a circuit-closing jumper attached at one end to one of the terminal clips, having a free end extending towards one of the other terminal clips and resiliently engaging it, but being depressible to disengage the terminal clip.

12. A clip formed from a strip of sheet metal with ends bent back upon themselves but spaced from the central portions of the strip, the central portions of the strip being bent up in a U-shape to bring the bent-back ends towards each other and parallel to form a longitudinal slot therebetween, the clip having a slot therein transverse to said longitudinal slot, cut through the original end and central portions of said strip, the spacing between the edges of said transverse slot being greater in the original central portion of the strip than in the original end portions of the strip.

13. A clip composed of resilient strip material having a reentrant U-shaped cross section with a main U-portion and reentrant parallel end portions between the arms of the main U-portion forming a longitudinal slot, the clip having a slot therein transverse to said longitudinal slot, intersecting the arms and the reentrant end portions of said U, and having strip portions parallel to said transverse slot along the edges thereof and supporetd by said reentrant end portions of said reentrant U.

14. A jumper for an electrical device comprising a strip of resilient electrically conducting material bent at the ends, one end being bent at an angle slightly exceeding 90 degrees and the other end being bent at such an angle that it tends to spring back to 90 degrees when flexed to an angle of less than 90 degrees, said latter end having curved transverse extensions thereon adapted to grasp an electrical terminal of substantially the same width as said strip at said latter end.

15. In combination, a jumper for an electrical device comprising a strip of resilient electrically-conducting material bent at the ends, one end being bent at an angle slightly exceeding 90 degrees and the other end being bent in the same direction at such an angle that it tends to spring back to 90 degrees when flexed to an angle of less than 90 degrees, said latter end having means therein for grasping the sides of a supporting terminal, and an insulating sheath curved to grasp the edges of the central portion of said strip and being ribbed in a direction away from the direction in which said ends are bent, said rib tapering to decreasing height towards the supported end of said strip.

HANS A. BAKKE.

CERTIFICATE OF CORRECTION.

Patent No. 2,105,396. January 11, 1938.

HANS A. BAKKE.

It is hereby certified that error appears in the printed specification of the above numbered patent requiring correction as follows: Page 3, second column, line 20, for "the" first occurrence, read and; and that the said Letters Patent should be read with this correction therein that the same may conform to the record of the case in the Patent Office.

Signed and sealed this 22nd day of February, A. D. 1938.

Henry Van Arsdale, (Seal) Acting Commissioner of Patents.

DISCLAIMER 2,105,396.—*Hans A. Bakke*, Swampscott, Mass. ELECTRIC METER MOUNTING. Patent dated January 11, 1938. Disclaimer filed June 9, 1939, by the assignee, *General Electric Company*.

Hereby disclaims the improvement described in claim 5 except where the "circuit-closing jumper" is supported solely by the "terminal contact" to which it is attached and the "circuit-closing jumper" is adapted to be depressed toward the base of the receptacle, and your petitioner, hereby disclaims the improvement described in claim 11 except where the "circuit-closing jumper" is supported solely by the "terminal clip" to which it is attached and the "circuit-closing jumper" is adapted to be depressed toward the base of the receptacle.

[*Official Gazette July 4, 1939.*]